(12) United States Patent
Kinomura et al.

(10) Patent No.: US 9,172,232 B2
(45) Date of Patent: Oct. 27, 2015

(54) CHARGING CABLE HOUSING APPARATUS

(75) Inventors: Shigeki Kinomura, Toyota (JP);
Tomoya Ono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 142 days.

(21) Appl. No.: 14/123,658

(22) PCT Filed: Jul. 14, 2011

(86) PCT No.: PCT/JP2011/066065
§ 371 (c)(1),
(2), (4) Date: Dec. 3, 2013

(87) PCT Pub. No.: WO2013/008329
PCT Pub. Date: Jan. 17, 2013

(65) Prior Publication Data
US 2014/0117144 A1  May 1, 2014

(51) Int. Cl.
| | |
|---|---|
| *H02G 11/02* | (2006.01) |
| *B65H 75/42* | (2006.01) |
| *B65H 75/44* | (2006.01) |
| *B65H 75/38* | (2006.01) |
| *B60L 1/00* | (2006.01) |
| *B60L 11/18* | (2006.01) |

(52) U.S. Cl.
CPC ............... *H02G 11/02* (2013.01); *B60L 1/003* (2013.01); *B60L 11/1818* (2013.01); *B60L 11/1877* (2013.01); *B65H 75/38* (2013.01); *B65H 75/425* (2013.01); *B65H 75/4402* (2013.01); *B60L 2230/12* (2013.01); *B60L 2270/32* (2013.01); *B60L 2270/34* (2013.01); *B65H 2701/34* (2013.01); *Y02T 10/7005* (2013.01); *Y02T 10/7088* (2013.01); *Y02T 90/121* (2013.01); *Y02T 90/14* (2013.01); *Y02T 90/16* (2013.01)

(58) Field of Classification Search
CPC ...... H02G 11/02; B65H 75/42; B65H 75/425; B65H 75/4402; B65H 75/44; B65H 75/38; B60L 11/1816; B60L 11/1818; Y02T 90/14
USPC .......................................... 191/12.2 R, 12.4
See application file for complete search history.

(56) References Cited

U.S. PATENT DOCUMENTS

| | | | | | |
|---|---|---|---|---|---|
| 972,457 | A | * | 10/1910 | Kohler | 191/12 R |
| 1,799,599 | A | * | 4/1931 | Moore | 242/399.2 |
| 3,021,089 | A | * | 2/1962 | Becker | 242/381 |
| 4,350,850 | A | * | 9/1982 | Kovacik et al. | 191/12.2 R |
| 4,467,979 | A | * | 8/1984 | Koehler | 242/396.1 |
| 4,475,649 | A | * | 10/1984 | Haarbosch | 206/702 |
| 6,346,006 | B1 | * | 2/2002 | Smith | 439/501 |
| 8,561,737 | B2 | * | 10/2013 | Ichikawa | 180/65.21 |

(Continued)

FOREIGN PATENT DOCUMENTS

| | | |
|---|---|---|
| JP | Y1-49-15752 | 4/1974 |
| JP | U-60-100375 | 7/1985 |

(Continued)

*Primary Examiner* — Zachary Kuhfuss
(74) *Attorney, Agent, or Firm* — Oliff PLC (57) ABSTRACT

A charging cable housing apparatus includes a winding core having a charging cable wound around an outer peripheral surface thereof, an end plate provided with a first slit extending from the winding core in a radial direction and having a predetermined width, and a side plate disposed to connect the base plate and the end plate and provided with a second slit having the same width as that of the first slit. One end of the charging cable wound around the winding core is being pulled out through the first slit or the second slit.

8 Claims, 8 Drawing Sheets

(56) References Cited

U.S. PATENT DOCUMENTS

| | | |
|---|---|---|
| 2011/0036676 A1* | 2/2011 | Skillman ............... 191/12.4 |
| 2011/0139521 A1 | 6/2011 | Ichikawa |
| 2014/0339039 A1* | 11/2014 | Ono ............... 191/12.4 |
| 2014/0339352 A1* | 11/2014 | Iwami et al. ............. 242/405 |
| 2015/0008274 A1* | 1/2015 | Mizuno et al. ............ 242/404 |
| 2015/0014128 A1* | 1/2015 | Mizuno et al. ............ 200/51.09 |
| 2015/0014464 A1* | 1/2015 | Dohara et al. ............ 242/405.3 |

FOREIGN PATENT DOCUMENTS

| | | |
|---|---|---|
| JP | U-3-127657 | 12/1991 |
| JP | A-07-137938 | 5/1995 |
| JP | A-08-033121 | 2/1996 |
| JP | H09-194147 A | 7/1997 |
| JP | A-11-335000 | 12/1999 |
| JP | A-2001-218350 | 8/2001 |
| JP | A-2011-130526 | 6/2011 |

* cited by examiner

CHARGING CABLE HOUSING APPARATUS

TECHNICAL FIELD

This invention relates to a charging cable housing apparatus.

BACKGROUND ART

In recent years, owing to environmental concerns, attention is being paid to a vehicle that utilizes electric power charged in a battery as motive power for driving wheels. In particular, a vehicle on which a battery for driving is mounted, such as a plug-in hybrid vehicle or an electric vehicle, is drawing much attention. Such a vehicle has a charging inlet that is provided in external charging equipment and through which a charging connector can be connected.

Owing to the increased attention being paid to the vehicle as described above, the development of charging cable housing apparatuses, each including a charging connector, is also ongoing.

The charging apparatus for an electric vehicle described in Japanese Patent Laying-Open No. 8-33121 (PTL 1) includes an operation box connected to a power supply cable, a charging cable connected to the power supply cable with this operation box being interposed therebetween, a charging connector connected to an end of the charging cable and can be joined to a vehicle-side connector, and a charging cable housing device for housing the charging cable.

This charging cable housing device is a reel-type housing device wherein the charging cable is wound for housing. At the time of charging, the charging cable is pulled out of the charging cable housing device.

In the coil-wound wire and the adaptor for feeding the same described in Japanese Patent Laying-Open No. 11-335000 (PTL 2), ring-shaped flat plates are provided on opposing end surfaces of cylindrically wound multiple layers of a wire (cable), and each of these flat plates is provided with notches extending from the central axis to edges of the flat plate.

With regard to the method of taking up a cable with a terminal device and the take-up drum described in Japanese Patent Laying-Open No. 7-137938 (PTL 3), the take-up drum for the cable has a partition, which is provided with a slit.

With regard to the apparatus for taking up a wire harness described in Japanese Patent Laying-Open No. 2001-218350 (PTL 4), a take-up barrel perpendicular to the axis of the drum of a drum main body for taking up a harness is provided with a hole through which the harness is passed, and this hole is provided with a guide roller.

CITATION LIST

Patent Literature

PTL 1: Japanese Patent Laying-Open No. 8-33121
PTL 2: Japanese Patent Laying-Open No. 11-335000
PTL 3: Japanese Patent Laying-Open No. 7-137938
PTL 4: Japanese Patent Laying-Open No. 2001-218350

SUMMARY OF INVENTION

Technical Problem

With the widespread use of such vehicles as described above, the development of charging cable housing apparatuses is an urgent need. Where a winding core for taking up a charging cable is included, an end plate provided around the winding core can be obstructive when pulling out or taking up the charging cable from the winding core, preventing the charging cable from being pulled out or taken up smoothly from the winding core.

Accordingly, the present invention was made to solve the aforementioned problem and provides a charging cable housing apparatus having a structure that allows a charging cable wound around a winding core to be easily pulled out, without being subject to restrictions on the pulling direction when it is used by a user.

Solution to Problem

A charging cable housing apparatus based on this invention includes a charging cable, a base plate, a winding core provided on the base plate such that it can rotate about a rotation shaft and having the charging cable wound around an outer peripheral surface thereof, an end plate disposed on a side of the winding core opposite to the base plate and provided with a first slit extending from the winding core in a radial direction and having a predetermined width, and a side plate surrounding around the winding core in a position at a predetermined distance away from the winding core in the radial direction, disposed to connect the base plate and the end plate, and provided with a second slit communicating with the first slit, wherein one end of the charging cable wound around the winding core is pulled out through the first slit or the second slit.

In another embodiment, the base plate is fixed to a wall, the first slit is provided to extend vertically downward from the winding core, and the second slit is provided vertically below the winding core along an axial direction of the winding core.

In another embodiment, each of a pair of end surfaces of the end plate that face the first slit is provided with a first contact roller rotating along with movement by contact with the charging cable, and each of a pair of end surfaces of the side plate that face the second slit is provided with a second contact roller rotating along with movement by contact with the charging cable.

In another embodiment, an interval between the pair of end surfaces of the end plate that face the first slit is provided to increase outwardly in the radial direction, such that the first slit has a fan shape, and an interval between outermost ends of the pair of end surfaces is provided to be greater than twice a maximum winding radius formed by the charging cable when it is wound around the winding core.

In another embodiment, one end of the charging cable wound around the winding core that is to be pulled out is provided with a weight, in a position outside of the first slit and the second slit.

In another embodiment, the one end of the charging cable being pulled out through the first slit or the second slit is connected to a charging connector fitted into an inlet provided in an apparatus that is to be charged, and electric power is supplied from the other end of the charging cable.

In another embodiment, the base plate is fixed to a vehicle on which a battery for driving the vehicle is mounted, the first slit is provided to extend vertically downward from the winding core, and the second slit is provided vertically below the winding core along an axial direction of the winding core.

In another embodiment, each of a pair of end surfaces of the end plate that face the first slit is provided with a first contact roller rotating along with movement by contact with the charging cable, and each of a pair of end surfaces of the side plate that face the second slit is provided with a second contact roller rotating along with movement by contact with the charging cable.

In another embodiment, an interval between the pair of end surfaces of the end plate that face the first slit is provided to increase outwardly in the radial direction, such that the first slit has a fan shape, and an interval between outermost ends of the pair of end surfaces is provided to be greater than twice a maximum winding radius formed by the charging cable when it is wound around the winding core.

In another embodiment, one end of the charging cable wound around the winding core that is to be pulled out is provided with a weight, in a position outside of the first slit and the second slit.

In another embodiment, the one end of the charging cable being pulled out through the first slit or the second slit is connected to a plug that is to be fitted into a receptacle provided at an external commercial power supply, and the other end of the charging cable is connected to the battery mounted on the vehicle.

Advantageous Effects of Invention

In accordance with a charging cable housing apparatus based on this invention, a charging cable housing apparatus can be provided having a structure that allows a charging cable wound around a winding core to be easily pulled out, without being subject to restrictions on the pulling direction.

DESCRIPTION OF EMBODIMENTS

A charging cable housing apparatus according to an embodiment based on the present invention will be described hereinafter, with reference to the drawings. It is noted that in various embodiments described below, unless otherwise stated, reference to a number, an amount, or the like does not necessarily limit the scope of the present invention to the number, the amount, or the like. Moreover, identical or corresponding components are denoted by identical reference numerals, and the same explanation may not be repeated. Further, the use of an appropriate combination of features in various embodiments is originally contemplated.

(First Embodiment: Charging Cable Housing Apparatus 100)

Figure 1:
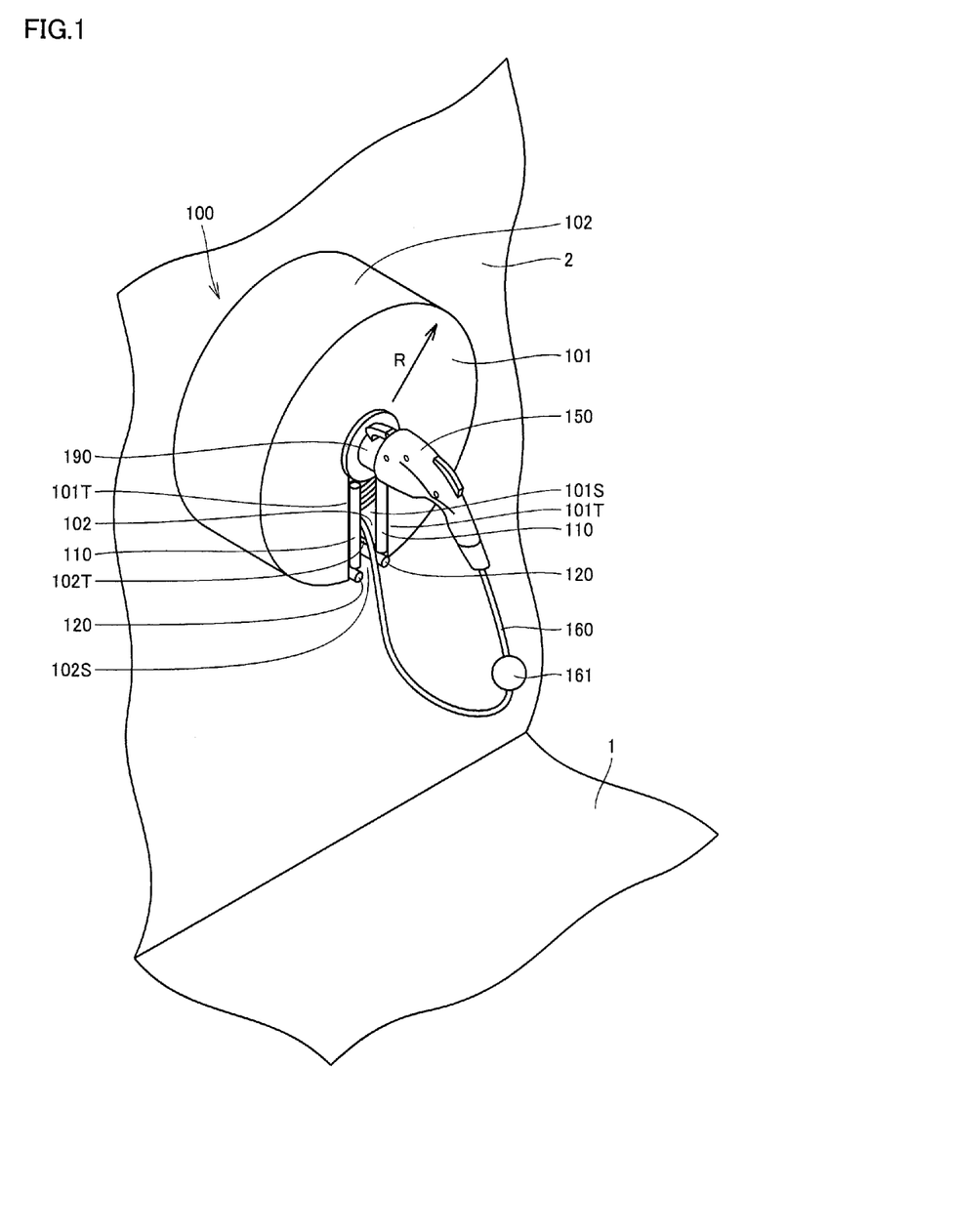
FIG. 1 is a perspective view showing an external structure of a charging cable housing apparatus according to a first embodiment.
Figure 2:
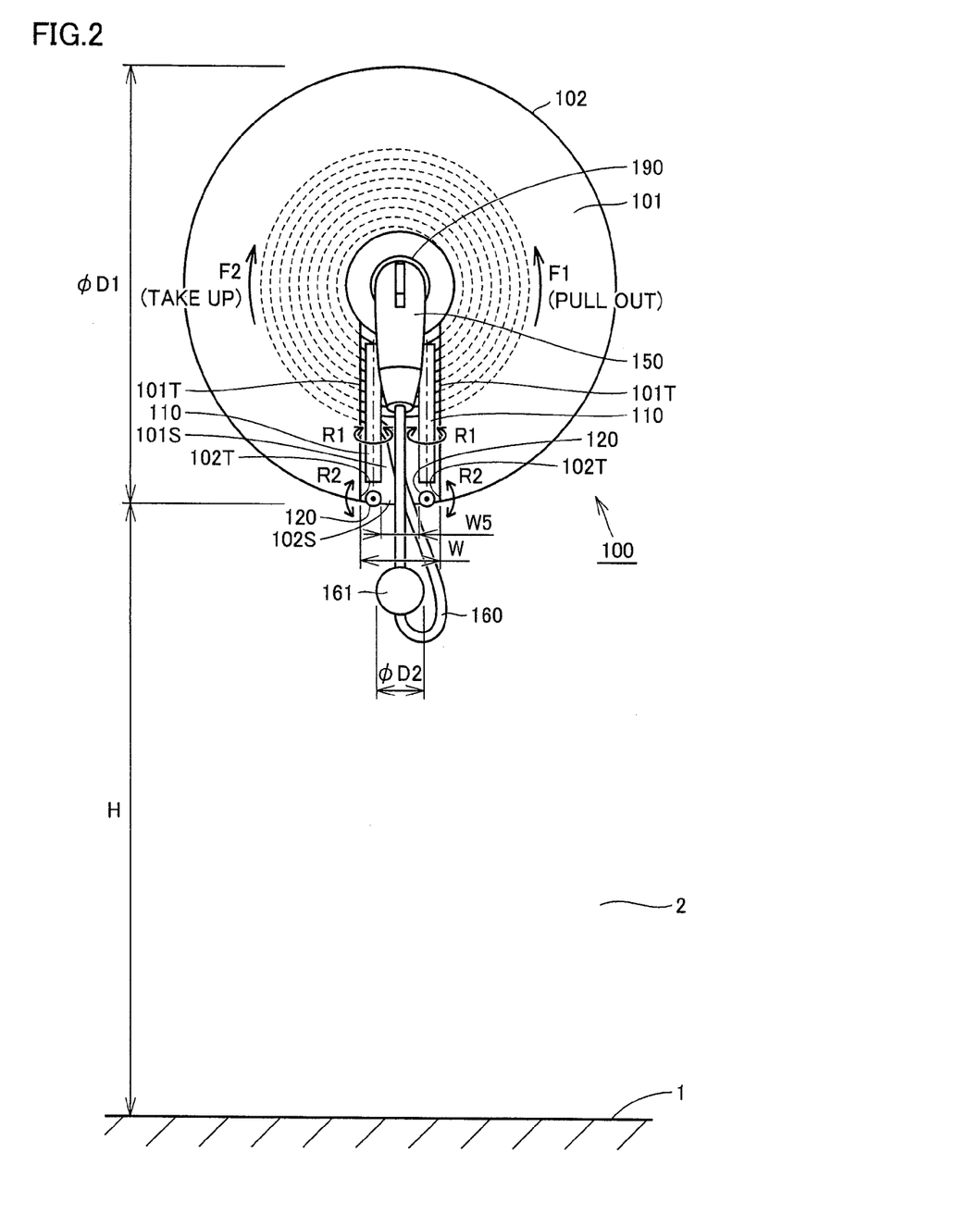
FIG. 2 is a front view of the charging cable housing apparatus according to the first embodiment.
Figure 3:
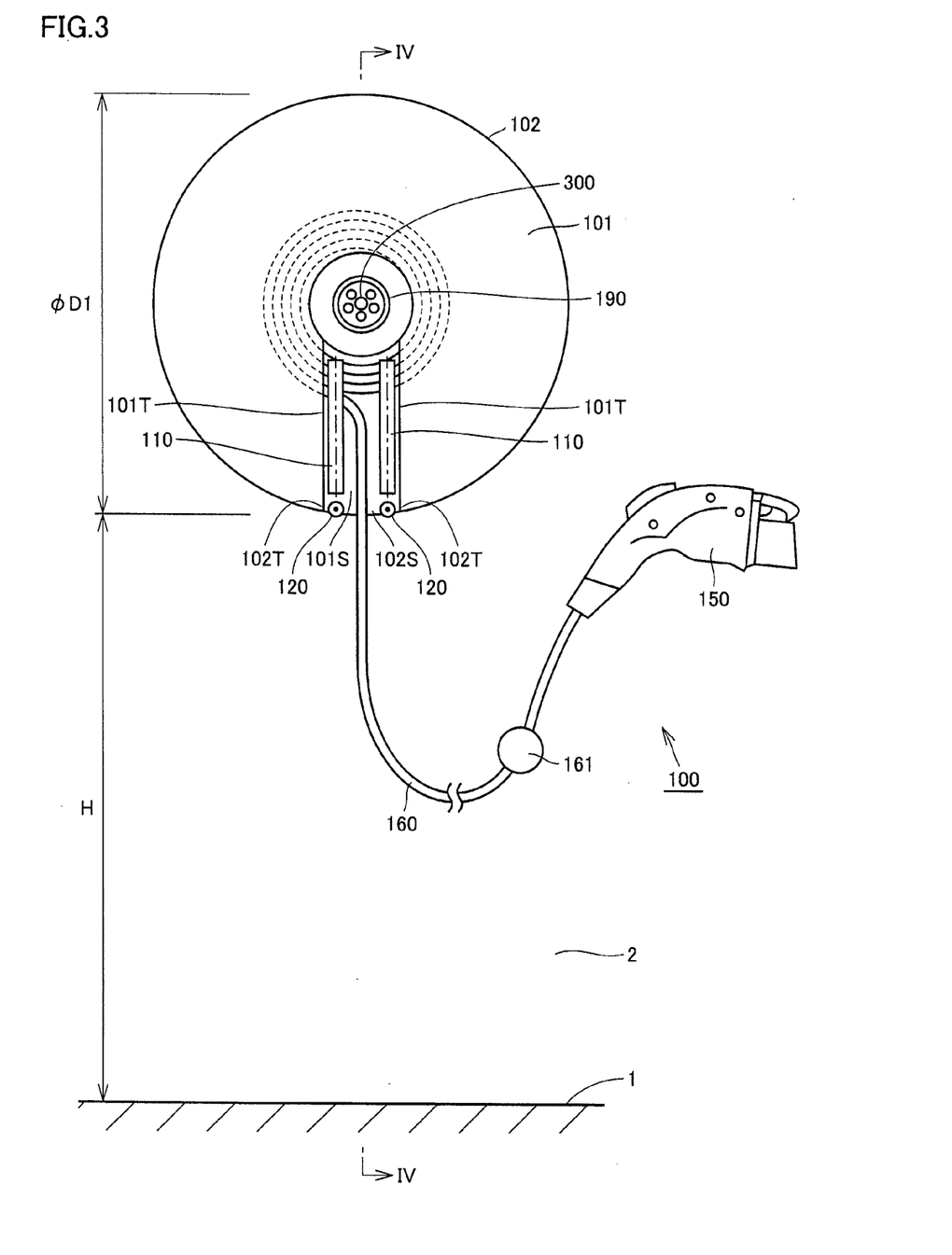
FIG. 3 is a front view of the charging cable housing apparatus according to the first embodiment in a state wherein the charging cable has been pulled out.
Figure 4:
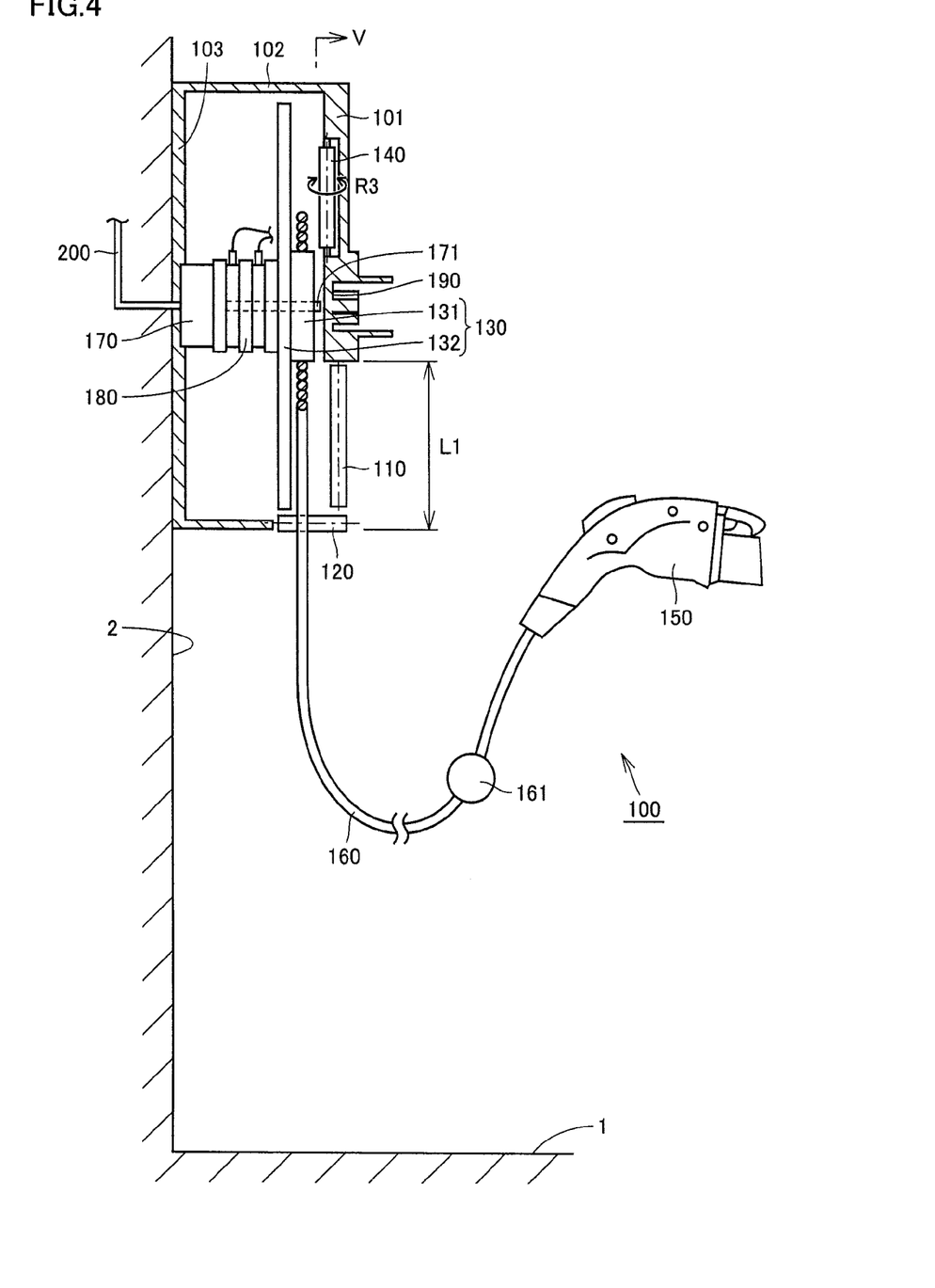
FIG. 4 is a cross-sectional view along arrow IV in FIG. 3.
Figure 5:
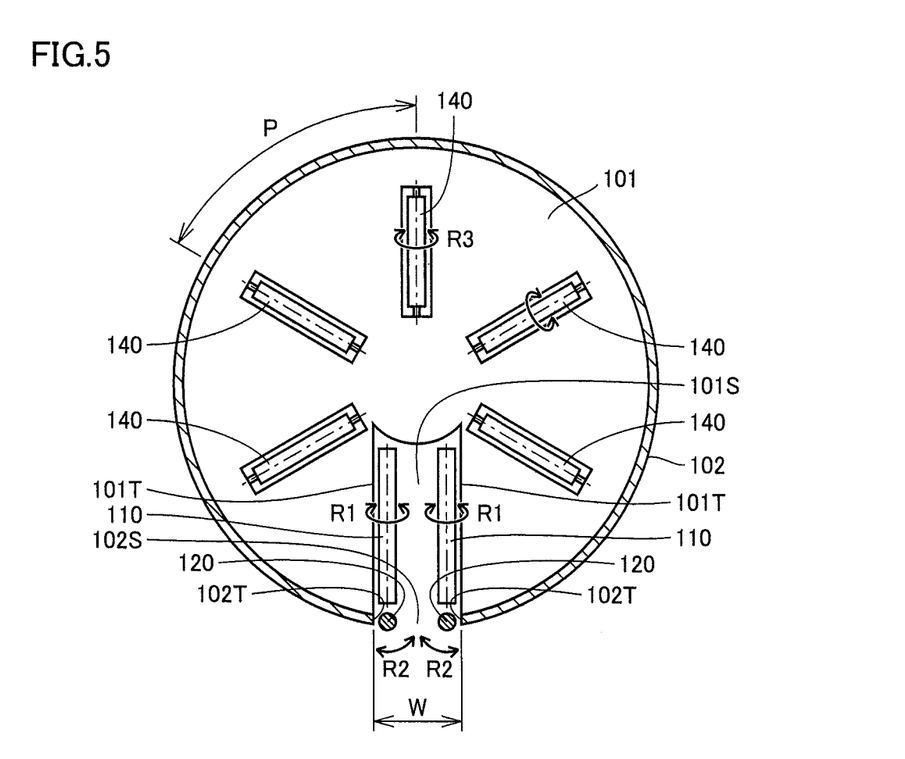
FIG. 5 is a view along arrow V in FIG. 4.

With reference to FIGS. 1 to 5, a charging cable housing apparatus 100 according to the present embodiment will be described. FIG. 1 is a perspective view showing an external structure of charging cable housing apparatus 100, FIG. 2 is a front view of charging cable housing apparatus 100, FIG. 3 is a front view of charging cable housing apparatus 100 in use, FIG. 4 is a cross-sectional view along arrow IV in FIG. 3, and FIG. 5 is a view along arrow V in FIG. 4.

With reference to FIGS. 1 and 2, charging cable housing apparatus 100 according to the present embodiment is attached onto a wall 2 of a parking lot facility or the like. Charging cable housing apparatus 100 has a circular external shape, and has a diameter ($\phi$D) of about 500 mm and a thickness of about 100 mm protruding from wall 2. In order to improve usability for a user at the time of use, charging cable housing apparatus 100 is attached at a height (a distance H from a lower end to the ground) of about 700 mm.

With reference to FIGS. 4 and 5, a detailed structure of charging cable housing apparatus 100 will be described. Charging cable housing apparatus 100 includes a disc-shaped base plate 103 fixed to wall 2, a base portion 170 fixed to base plate 103 and supporting a rotation shaft 171, and a winding core 130 provided such that it can rotate about rotation shaft 171. Winding core 130 has a winding drum 131 and a disc-shaped supporting plate 132 disposed on a wall 2 side.

A charging cable 160 is wound around winding core 130. One end of charging cable 160 is joined to a charging connector 150, which is fitted into an inlet provided in a vehicle on which a battery for driving is mounted. In the present embodiment, charging cable 160 is wound around winding core 130 in a counterclockwise direction.

A slip ring 180 is provided between rotation shaft 171 and winding core 130. Slip ring 180 serves to join an external power supply line 200 embedded in wall 2 and the other end of charging cable 160, whereby electric power can be supplied to charging cable 160, which rotates together with winding core 130.

A disc-shaped end plate 101 is provided on a side of winding core 130 opposite to base plate 103. A recessed accommodation region 190 for detachably accommodating charging connector 150 is provided in a central portion of an outer peripheral surface of disc-shaped end plate 101.

While recessed accommodation region 190 is not an indispensable component, it is preferably provided to enhance usability for a user. The position in which recessed accommodation region 190 is provided is not limited to the central portion of the outer peripheral surface of end plate 101.

An opening 300 (see FIG. 3) into which a handle (not shown) to be fitted into rotation shaft 171 is inserted when taking up charging cable 160 is provided in the central portion of end plate 101. It is noted that this opening is not provided where a motor is used for driving rotation shaft 171.

An annular side plate 102 is provided between base plate 103 and the outer peripheral surface of end plate 101. Annular side plate 102 surrounds around winding core 130 in a position at a predetermined distance away from winding core 130 in a radial direction (R), joins base plate 103 and end plate 101, and defines a space that houses base portion 170, rotation shaft 171, winding core 130, and charging cable 160.

As shown in FIG. 5, end plate 101 is provided with a first slit 101S extending from winding core 130 in the radial direction (R) and having a predetermined width W. In the present embodiment, first slit 101S is provided to extend vertically downward from winding core 130, and a pair of end surfaces 101T, 101T of end plate 101 that face first slit 101S are provided in parallel with each other.

On an inside surface of end plate 101, sliding rollers 140, whose rotation shaft extends in the radial direction (R), are provided in five positions at a predetermined pitch (P). The number of sliding rollers 140 is not limited to five, and may be selected as appropriate.

Sliding rollers 140 are provided, such that they are rotated (in a direction R3) by contact with charging cable 160 when pulling out or taking up charging cable 160. In this way, friction caused by sliding movement between the inside surface of end plate 101 and charging cable 160b can be reduced.

The pair of end surfaces 101T, 101T of end plate 101 are provided in parallel with each other, and each of end surfaces 101T, 101T is also provided with a first contact roller 110 that rotates (in a direction R1) along with movement by contact with charging cable 160.

Side plate 102 is also provided with a second slit 102S communicating with first slit 101S and having the same width (W) as that of first slit 101S. Since second slit 102S communicates with first slit 101S, it is provided vertically below winding core 130 along an axial direction of winding core 130.

A pair of end surfaces 102T, 102T of side plate 102 are provided in parallel with each other, and each of end surfaces 102T, 102T is also provided with a second contact roller 120 that rotates (in a direction R2) along with movement by contact with charging cable 160.

With reference to FIGS. 2 and 3, in charging cable housing apparatus 100 having the above-described structure, charging cable 160 is pulled out through first slit 101S or second slit 102S. In FIG. 2, arrow F1 represents a direction of rotation of winding core 130 when pulling out charging cable 160, and arrow F2 represents a direction of rotation of winding core 130 when taking up charging cable 160.

Charging cable 160 is provided with a weight 161 in a position outside of first slit 101S and second slit 102S. The weight of weight 161 helps the user to pull out charging cable 160.

In the present embodiment, by using spherical weight 161 greater in diameter than an interval (W5) between the pair of second contact rollers 120, it is possible to determine a position at which taking up of charging cable 160 is stopped.

During take-up, since charging cable housing apparatus 100 is attached at a height (distance H from the lower end to the ground) of about 700 mm, charging cable 160 is positioned vertically below second slit 102S, owing to self-weights of charging cable 160 and weight 161. Therefore, interference with an operation of taking up charging cable 160 by the user is avoided.

As described above, according to charging cable housing apparatus 100 in the present embodiment, charging cable 160 can be pulled out through first slit 101S or second slit 102S. Particularly since first slit 101S is provided in end plate 101 to communicate with second slit 102S provided in side plate 102, the user can pull out charging cable 160 in a direction substantially perpendicular to wall 2.

This results in an improvement in workability when the user pulls out charging cable 160 toward the vehicle, allowing the user to easily pull out charging cable 160.

Moreover, since first slit 101S is provided in a position readily observable from the user, even in case of trouble with taking up charging cable 160, the user can easily find such take-up trouble. Further, even where charging cable 160 itself is damaged, the user can easily find such damage.

Furthermore, first slit 101S and second slit 102S are joined to each other to form a large opening, thus facilitating ejection of foreign matter such as fallen leaves, trash, and the like that have entered inside charging cable housing apparatus 100. Moreover, heat generated during supply of electric power can be released outside, thereby avoiding an increase in the temperature of charging cable housing apparatus 100.

Second Embodiment: Charging Cable Housing Apparatus 100A)

Figure 6:
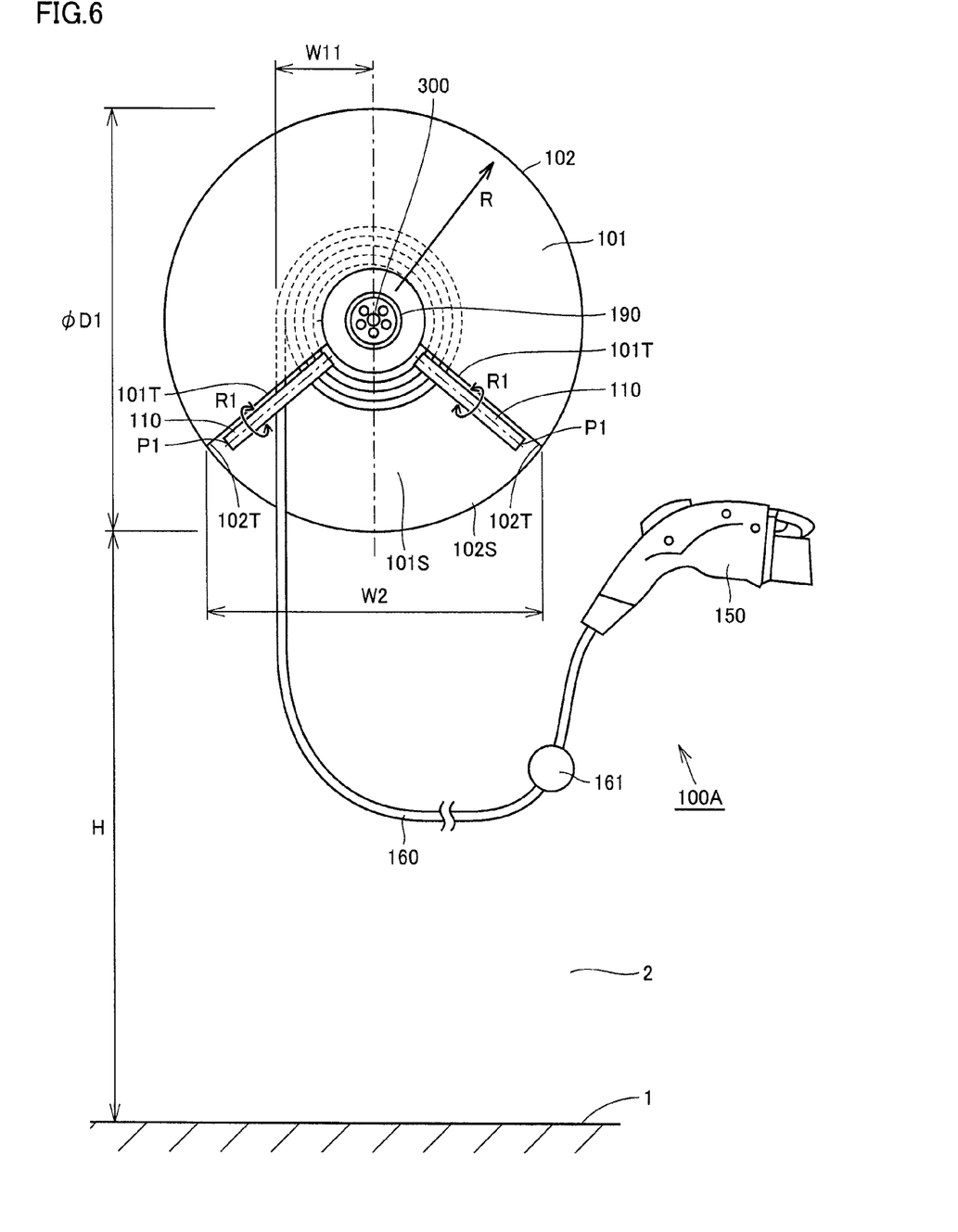
FIG. 6 is a front view of the charging cable housing apparatus according to a second embodiment in a state wherein the charging cable has been pulled out.

With reference to FIG. 6, a charging cable housing apparatus 100A according to an embodiment will be described. Differences between charging cable housing apparatus 100A and the above-described charging cable housing apparatus 100 will be described herein. Common features are denoted by identical reference numbers, and the same description will not be repeated. FIG. 6 is a front view of charging cable housing apparatus 100A in a state wherein charging cable 160 has been pulled out.

Charging cable housing apparatus 100A according to the present embodiment has features in the forms of first slit 101S provided in end plate 101 and second slit 102S provided in side plate 102.

An interval between the pair of end surfaces 101T, 101T of end plate 101 that face first slit 101S is provided to increase outwardly in the radial direction (R), such that first slit 101S has a fan shape.

Moreover, an interval (W2) between outermost ends of the pair of end surfaces 101T, 101T is provided to be greater than twice a maximum winding radius (W11) formed by charging cable 160 when it is wound around winding core 130. An interval between end surfaces 102T, 102T of second slit 102S corresponds to the interval (W2) between the outermost ends of the pair of end surfaces 101T, 101T, and the pair of end surfaces 102T, 102T are provided in parallel with each other.

In this way, even when charging cable 160 is suspended below under its own weight, it is positioned between the outermost ends of the pair of end surfaces 101T, 101T. It is noted that in the present embodiment, while each of the pair of end surfaces 101T, 101T is provided with first contact roller 110, the pair of end surfaces 102T, 102T are not provided with second contact rollers 120.

This is because the fan shape of first slit 101S reduces the possibility of charging cable 160 coming into contact with the pair of end surfaces 102T, 102T of side plate 102. It is noted that a structure in which each of the pair of end surfaces 102T, 102T of side plate 102 has second contact roller 120 may also be adopted.

The foregoing charging cable housing apparatus 100A according to the present embodiment can also achieve functions and effects similar to those obtained by charging cable housing apparatus 100 according to the first embodiment. Furthermore, the fan shape of first slit 101S enlarges the opening area, thus leading to enlargement in the pulling direction, improved easiness of finding any problem with charging cable 160, and improved radiation performance.

Third Embodiment: Mounting of Charging Cable Housing Apparatus 100 on Vehicle)

Figure 7:
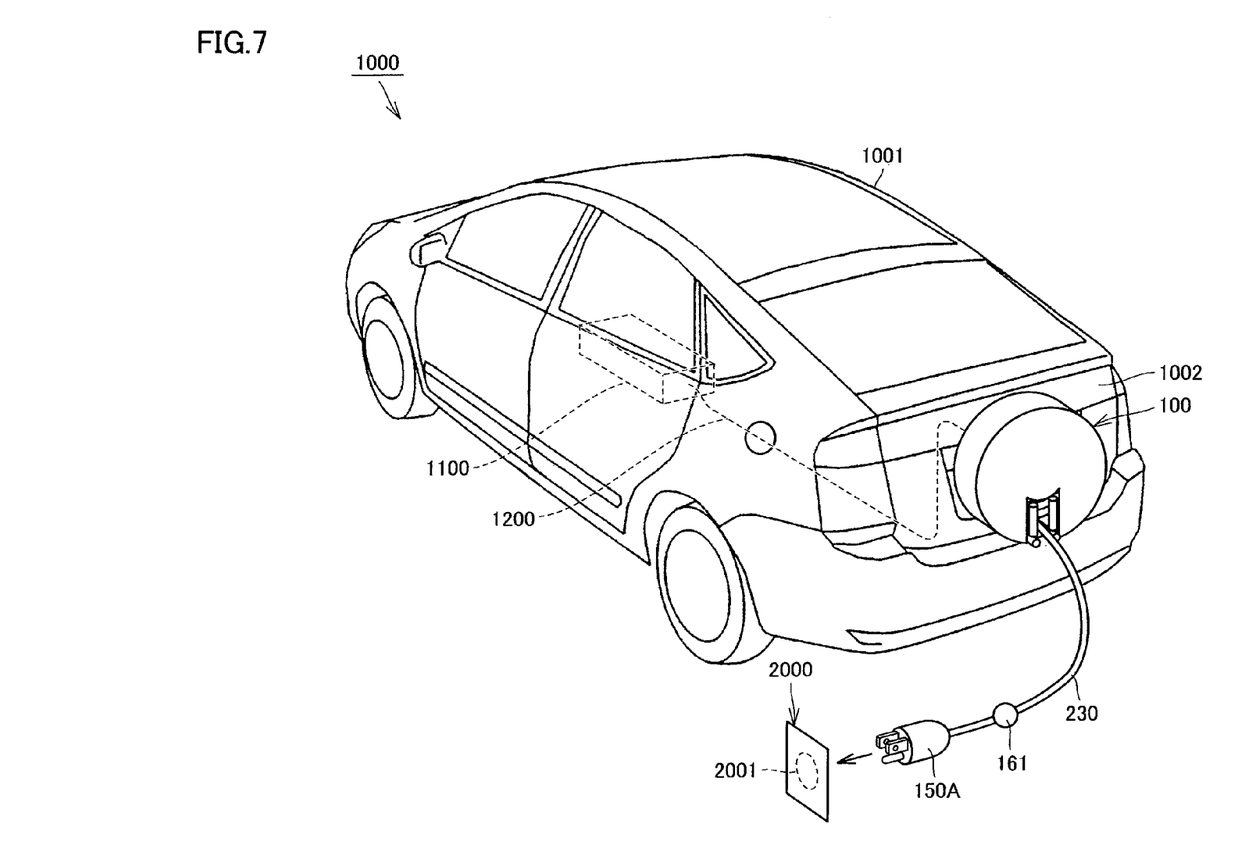
FIG. 7 is a front view of a charging cable housing apparatus according to a third embodiment in use.

With reference to FIG. 7, a case where charging cable housing apparatus 100 according to the first embodiment is mounted on a vehicle 1000 will be described. A battery 1100 for driving is mounted on a vehicle main body 1001 of vehicle 1000, as in a plug-in hybrid vehicle or an electric vehicle, for example.

FIG. 7 shows a state in which charging cable housing apparatus 100 is externally attached to a back door 1002 of vehicle main body 1001. It is noted that the position on which charging cable housing apparatus 100 is mounted is not limited to the outside of back door 1002, and may be a trunk room, for example.

Where charging cable housing apparatus 100 is mounted on vehicle 1000, in place of charging connector 150, a plug 150A, which is to be fitted into a receptacle 2001 provided at an external commercial power supply, is connected to one end of charging cable 160 that is being pulled out through first slit 101S or second slit 102S. The other end of charging cable 160 is connected to an internal power supply harness 1200 that is to be joined to battery 1100 mounted on vehicle 1000, with slip ring 180 being interposed therebetween.

As described above, similar functions and effects can be achieved even where charging cable housing apparatus 100 having the structure according to the first embodiment is mounted on vehicle 1000.

Fourth Embodiment: Mounting of Charging Cable Housing Apparatus 100A on Vehicle)

Figure 8:
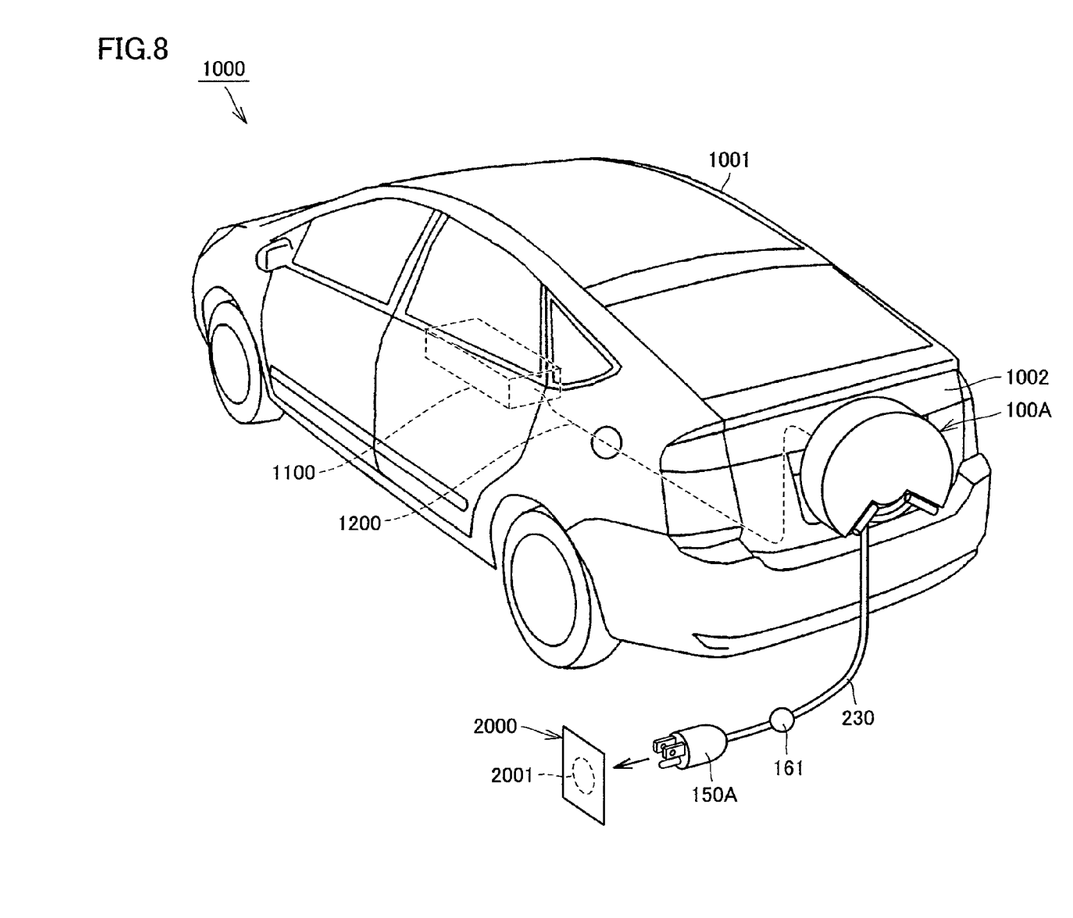
FIG. 8 is a front view of a charging cable housing apparatus according to a third embodiment in use.

With reference to FIG. 8, a case where charging cable housing apparatus 100A according to the second embodiment is mounted on a vehicle 1000 will be described. Vehicle 1000 is the same as the one according to the third embodiment.

Where charging cable housing apparatus 100A is mounted on vehicle 1000 also, in place of charging connector 150, a plug 150A, which is to be fitted into receptacle 2001 provided at the external commercial power supply, is connected to one end of charging cable 160 that is being pulled out through first slit 101S or second slit 102S. The other end of charging cable 160 is joined to internal power supply harness 1200 that is to be joined to battery 1100 mounted on vehicle 1000, with slip ring 180 being interposed therebetween.

As described above, similar functions and effects can be achieved even where charging cable housing apparatus 100A having the structure according to the second embodiment is mounted on vehicle 1000.

As described above, according to each of charging cable housing apparatuses 100, 100A in the foregoing embodiments, a charging cable housing apparatus can be provided having a structure that allows a charging cable wound around a winding core to be easily pulled out, without being subject to restrictions on the pulling direction.

It should be understood that the embodiments and examples disclosed herein are illustrative and non-restrictive in every respect. The scope of the present invention is defined by the terms of the claims, rather than by the foregoing description, and is intended to include any modifications within the scope and meaning equivalent to the terms of the claims.

Reference Signs List

1: parking lot facility, 2: wall, 100, 100A: charging cable housing apparatus, 101: end plate, 101S: first slit, 101T, 102T: end surface, 102: side plate, 102S: second slit, 103: base plate, 110: first contact roller, 120: second contact roller, 130: winding core, 131: winding drum, 132: supporting plate, 140: sliding roller, 150: charging connector, 160: charging cable, 161: weight, 170: base portion, 171: rotation shaft, 180: slip ring, 190: recessed accommodation region, 200: external power supply line, 300: opening, 1000: vehicle, 1100: battery, 1001: vehicle main body, 1002: back door

The invention claimed is:

1. A charging cable housing apparatus comprising:
a charging cable;
a base plate;
a winding core provided on said base plate such that said winding core can rotate about a rotation shaft and having said charging cable wound around an outer peripheral surface thereof;
an end plate disposed on a side of said winding core opposite to said base plate and provided with a first slit extending from said winding core in a radial direction and having a predetermined width; and
a side plate surrounding around said winding core in a position at a predetermined distance away from said winding core in said radial direction, disposed to connect said base plate and said end plate, and provided with a second slit communicating with said first slit,
one end of said charging cable wound around said winding core being pulled out through said first slit or said second slit,
said base plate being fixed to a wall,
said first slit being provided to extend vertically downward from said winding core,
said second slit being provided vertically below said winding core along an axial direction of said winding core,
an interval between a pair of end surfaces of said end plate that face said first slit being provided to increase outwardly in said radial direction, such that said first slit has a fan shape, and
an interval between outermost ends of said pair of end surfaces being provided to be greater than twice a maximum winding radius formed by said charging cable when said charging cable is wound around said winding core.

2. The charging cable housing apparatus according to claim 1, wherein
each of the pair of end surfaces of said end plate that face said first slit is provided with a first contact roller rotating along with movement by contact with said charging cable, and
each of a pair of end surfaces of said side plate that face said second slit is provided with a second contact roller rotating along with movement by contact with said charging cable.

3. The charging cable housing apparatus according to claim 1, wherein
the one end of said charging cable wound around said winding core that is to be pulled out is provided with a weight, in a position outside of said first slit and said second slit.

4. The charging cable housing apparatus according to claim 1, wherein
the one end of said charging cable being pulled out through said first slit or said second slit is connected to a charging connector fitted into an inlet provided in an apparatus that is to be charged, and
electric power is supplied from the other end of said charging cable.

5. A charging cable housing apparatus comprising:
a charging cable;
a base plate;
a winding core provided on said base plate such that said winding core can rotate about a rotation shaft and having said charging cable wound around an outer peripheral surface thereof;
an end plate disposed on a side of said winding core opposite to said base plate and provided with a first slit extending from said winding core in a radial direction and having a predetermined width; and
a side plate surrounding around said winding core in a position at a predetermined distance away from said winding core in said radial direction, disposed to connect said base plate and said end plate, and provided with a second slit communicating with said first slit,
one end of said charging cable wound around said winding core being pulled out through said first slit or said second slit,
said base plate being fixed to a vehicle on which a battery for driving the vehicle is mounted,
said first slit being provided to extend vertically downward from said winding core, said second slit being provided vertically below said winding core along an axial direction of said winding core, an interval between a pair of end surfaces of said end plate that face said first slit being provided to increase outwardly in said radial direction, such that said first slit has a fan shape, and an interval between outermost ends of said pair of end surfaces being provided to be greater than twice a maximum winding radius formed by said charging cable when said charging cable is wound around said winding core.

6. The charging cable housing apparatus according to claim 5, wherein each of the pair of end surfaces of said end plate that face said first slit is provided with a first contact roller rotating along with movement by contact with said charging cable, and each of a pair of end surfaces of said side plate that face said second slit is provided with a second contact roller rotating along with movement by contact with said charging cable.

7. The charging cable housing apparatus according to claim 5, wherein the one end of said charging cable wound around said winding core that is to be pulled out is provided with a weight, in a position outside of said first slit and said second slit.

8. The charging cable housing apparatus according to claim 5, wherein the one end of said charging cable being pulled out through said first slit or said second slit is connected to a plug that is to be fitted into a receptacle provided at an external commercial power supply, and the other end of said charging cable is connected to said battery mounted on said vehicle.

* * * * *